United States Patent
Glauber

(10) Patent No.: US 10,619,972 B1
(45) Date of Patent: Apr. 14, 2020

(54) GLASS BREAK APPARATUS

(71) Applicant: Bryan B. Glauber, Melbourne Beach, FL (US)

(72) Inventor: Bryan B. Glauber, Melbourne Beach, FL (US)

(*) Notice: Subject to any disclaimer, the term of this patent is extended or adjusted under 35 U.S.C. 154(b) by 0 days.

(21) Appl. No.: 16/436,386

(22) Filed: Jun. 10, 2019

(51) Int. Cl.
| | |
|---|---|
| *F41C 27/16* | (2006.01) |
| *C03B 33/12* | (2006.01) |
| *F41G 11/00* | (2006.01) |
| *B25D 11/02* | (2006.01) |
| *B25D 5/02* | (2006.01) |
| *A62B 3/00* | (2006.01) |

(52) U.S. Cl.
CPC .............. *F41C 27/16* (2013.01); *A62B 3/005* (2013.01); *B25D 5/02* (2013.01); *B25D 11/02* (2013.01); *C03B 33/12* (2013.01); *F41G 11/001* (2013.01)

(58) Field of Classification Search
CPC ........ F41C 27/16; F41C 27/00; F41G 11/001; F41G 11/003; F41G 1/35; F41G 1/34; F41G 1/36; A62B 3/005; B25D 11/02; B25D 5/02; C03B 33/12; F21L 4/005; F21V 23/0414; F21V 33/0064
See application file for complete search history.

(56) References Cited

U.S. PATENT DOCUMENTS

| | | | | |
|---|---|---|---|---|
| 1,735,212 A | * | 11/1929 | Pawsat | B60Q 1/0483 248/229.24 |
| 5,628,555 A | * | 5/1997 | Sharrah | F41G 1/34 362/114 |
| 5,657,543 A | * | 8/1997 | Collins | A62B 3/005 30/123 |
| 5,791,056 A | * | 8/1998 | Messina | A62B 3/005 30/361 |
| 5,860,728 A | * | 1/1999 | Maglica | B62J 6/00 362/191 |
| 5,952,916 A | * | 9/1999 | Yamabe | B25D 1/00 340/321 |
| 6,036,332 A | | 3/2000 | Antal | |
| 6,199,997 B1 | * | 3/2001 | Outsen | A62B 3/005 362/109 |
| 6,418,628 B1 | * | 7/2002 | Steingass | A62B 3/005 30/366 |
| 6,666,566 B1 | * | 12/2003 | Uke | F21V 33/0064 362/109 |

(Continued)

FOREIGN PATENT DOCUMENTS

| | | | | |
|---|---|---|---|---|
| CN | 205059497 U | | 3/2016 | |
| GB | 2173237 A | * | 3/1985 | |
| WO | WO-2011052912 A2 | * | 5/2011 | ............. A62B 3/005 |

*Primary Examiner* — Jonathan G Riley
(74) *Attorney, Agent, or Firm* — Burr & Forman LLP; Jeffrey H. Kamenetsky

(57) ABSTRACT

A glass break apparatus including an attachment mechanism comprising an attachment region configured to attach to an end of a light-emitting device and a receptacle coupled to the attachment region. The glass break apparatus also including an elongated glass punch retained at least partially within the receptacle, the glass punch having a first end and a second end, the glass punch configured to move between a retracted position within the interior of the receptacle and an extended position due to impact with a surface of glass, the first end of the glass punch extending beyond a plane of the attachment region while in the extended position.

7 Claims, 11 Drawing Sheets

(56) References Cited

U.S. PATENT DOCUMENTS

| | | | |
|---|---|---|---|
| 7,028,874 B2 | 4/2006 | Lin | |
| 7,076,908 B2 * | 7/2006 | Kim | F41C 27/00 42/115 |
| 7,108,390 B2 * | 9/2006 | Lawless | F41G 1/35 362/109 |
| 7,188,969 B2 * | 3/2007 | Uke | F21L 4/04 362/197 |
| 7,194,836 B1 * | 3/2007 | Urban | F41C 27/22 42/106 |
| 7,334,365 B2 * | 2/2008 | Kim | F41G 11/003 42/124 |
| 7,557,720 B2 | 7/2009 | Rubin et al. | |
| 7,578,090 B1 * | 8/2009 | Romaszka | F41C 27/16 42/85 |
| 7,731,380 B2 * | 6/2010 | Wu | F41G 11/003 362/110 |
| 7,854,085 B1 * | 12/2010 | Hodgkins | F41C 27/16 42/85 |
| 8,196,328 B2 | 6/2012 | Simpkins | |
| 8,661,723 B2 | 3/2014 | Emde et al. | |
| 9,006,593 B2 * | 4/2015 | Rorick | F21L 4/005 200/60 |
| 9,157,471 B2 * | 10/2015 | Jungeberg | F16C 11/0604 |
| 9,291,418 B2 * | 3/2016 | McNitt | F41C 27/16 |
| 10,365,069 B1 * | 7/2019 | Tayon | |
| 2002/0006038 A1 * | 1/2002 | Fladung | A62B 3/005 362/157 |
| 2003/0106919 A1 * | 6/2003 | Chuang | B62J 11/00 224/420 |
| 2005/0120563 A1 * | 6/2005 | Lin | A62B 3/005 30/123 |
| 2010/0301088 A1 * | 12/2010 | Purdy | A62B 3/005 225/103 |
| 2013/0167601 A1 * | 7/2013 | Colasse | A62B 3/005 70/395 |
| 2014/0168952 A1 | 6/2014 | Young | |
| 2015/0033477 A1 * | 2/2015 | Rubin | B25D 5/02 7/158 |

* cited by examiner

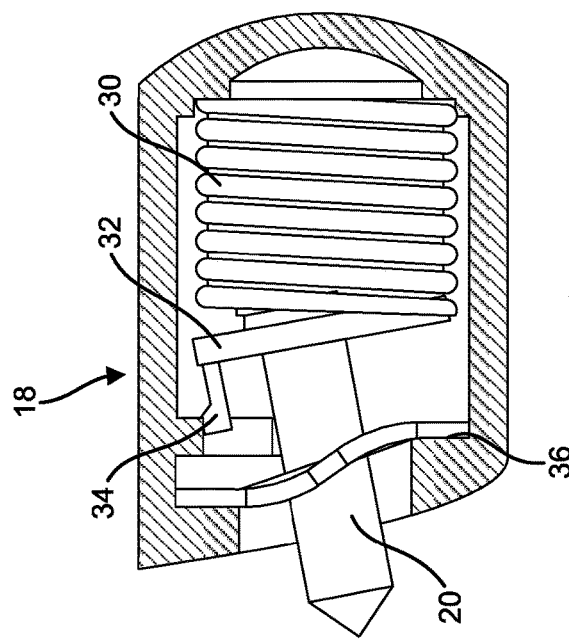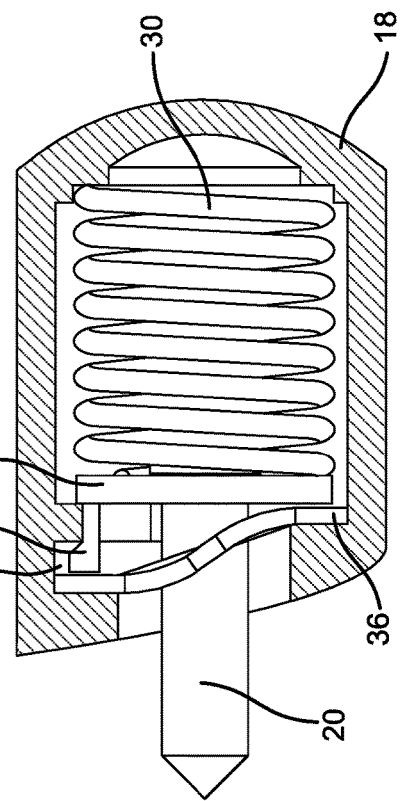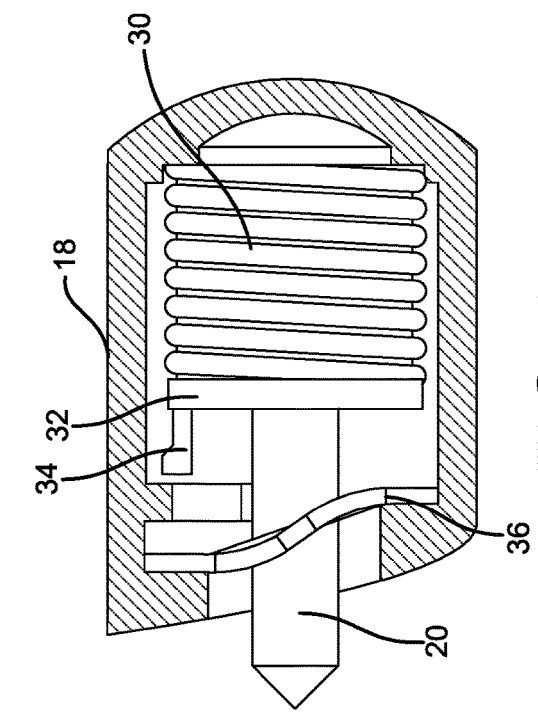

GLASS BREAK APPARATUS

TECHNICAL FIELD

This disclosure relates to glass break devices and more specifically to a glass break apparatus that can be affixed to a light-emitting apparatus such as a flashlight or a tactical weapon light to thus eliminate the need for two separate devices.

BACKGROUND

Police officers or EMS first responders are often faced with the challenge of having to use carry multiple devices; for example, a glass break device, a weapon, and a flashlight. Switching between two or three of these devices is difficult when two may be needed simultaneously. For example, in the situation of a police officer attempting to remove a suspect from a car, the officer will need to first holster his or her weapon prior to attempting to break the window, thus compromising the safety of the officer. For an EMS first responder attempting to rescue an individual from a vehicle, home, or storefront with a plate-glass window when time is of the essence, the responder likewise cannot continue to use their flashlight while attempting at the same time to break the window with a separate device.

Thus, there is a clear need for a glass punch apparatus that can be secured to a light-emitting device such as a flashlight such that the both the flashlight and glass punch apparatus can be used simultaneously and with one hand, without the need for the user to switch back and forth between the two objects.

There is also a clear need for a glass punch apparatus that can be secured to a light-emitting device such as a tactical weapon light, such that the glass punch apparatus, the tactical weapon light, and, if needed, the tactical weapon, can all be used simultaneously without the need for the user to switch back and forth between objects.

The present disclosure addresses these needs.

SUMMARY

The glass break apparatus of the present disclosure, as described herein, can be affixed to the exterior of a light-emitting device, such as, for example, a flashlight or a tactical weapon light fixture. This will advantageously allow a user, such as a police officer or EMS first responder to be able to shine light on an object behind a glass window, break the glass window, and if needed, deploy a tactical weapon, without the need to switch from one device to another.

With the glass break apparatus of the present disclosure mounted to a police officer's tactical weapons light or an EMS responder's flashlight, the need to carry separate tools for this process is eliminated. For the layperson, this device can likewise be used for self-protection within the home, for example in the event of a fire requiring the ability to exit through a window, in a vehicle that has become trapped in water, or for use on a personal weapon.

In one aspect of the present disclosure, a glass break apparatus is provided. The glass break apparatus includes an attachment mechanism comprising an attachment region configured to attach to an end of a light-emitting device, and a receptacle coupled to the attachment region. The glass break apparatus further comprises an elongated glass punch retained at least partially within the receptacle, the glass punch having a first end and a second end, the glass punch configured to move between a retracted position within the interior of the receptacle and an extended position due to impact with a surface of glass, the first end of the glass punch extending beyond a plane of the attachment region while in the extended position.

In another aspect of the present disclosure, a glass break apparatus is provided, the glass break apparatus including a receptacle incorporated into a bezel of a light-emitting device, the receptacle comprising an elongated glass punch retained at least partially within the receptacle, the glass punch having a first end and a second end, the glass punch configured to move between a retracted position within the interior of the receptacle and an extended position due to impact with a surface of glass, the first end of the glass punch extending beyond a plane of the bezel while in the extended position.

In yet another aspect of the present disclosure, a glass break apparatus is provided, the glass break apparatus including a receptacle incorporated into a housing of a light-emitting device, the receptacle comprising an elongated glass punch retained at least partially within the receptacle, the glass punch having a first end and a second end, the glass punch configured to move between a retracted position within the interior of the receptacle and an extended position due to impact with a surface of glass, the first end of the glass punch extending beyond a plane of the housing while in the extended position.

In still another aspect of the present disclosure, a glass break apparatus is provided, where the glass break apparatus a tubular casing having an interior and an exterior, the casing having an open end, an elongated glass punch having a first end and a second end, the glass punch configured to move between a retracted position and an extended position within the interior of the casing, and while in the extended position the first end of the glass punch extends at least partially through the open end of the casing to strike a surface of glass, and an attachment ring having a first central aperture sized to receive a light-emitting device, the attachment ring further including a second aperture sized to receive the tubular casing housing the glass punch therein.

BRIEF DESCRIPTION OF DRAWINGS

FIG. 8A is an illustration of the glass punch element in an initial retracted position within the receptacle prior to impact;

FIG. 8B is an illustration of the glass punch element upon impact;

FIG. 8C is an illustration of the glass punch element in an extended position subsequent to impact;

DETAILED DESCRIPTION OF EXEMPLARY EMBODIMENTS

The present disclosure provides a novel glass break apparatus that can affix to a light-emitting device such as a light fixture attached to a firearm, or a flashlight, and allows a user to use the light-emitting device to illuminate an area and simultaneously use a glass punch portion of the glass break apparatus to break glass that is illuminated by the light-emitting device. In this fashion, the user does not need to first illuminate the area with one device, retrieve a separate glass punch device and then try and deploy the glass punch device while still trying to shine the light from the light-emitting device on the glass area.

It should be noted that although a majority of the figures show the glass break apparatus attached to a light-emitting device and the light-emitting device affixed to a firearm, the glass break apparatus of the present disclosure is not limited in any way to use with a firearm. As explained herein, the glass break apparatus is configured to be affixed, in a variety of different fashions, to a light-emitting device, or other type of apparatus. Attaching the light-emitting device to a firearm is just one non-limiting embodiment. The glass break apparatus can be affixed to various other types of light-emitting devices and not just the type that is affixed to a firearm.

Figure 1:
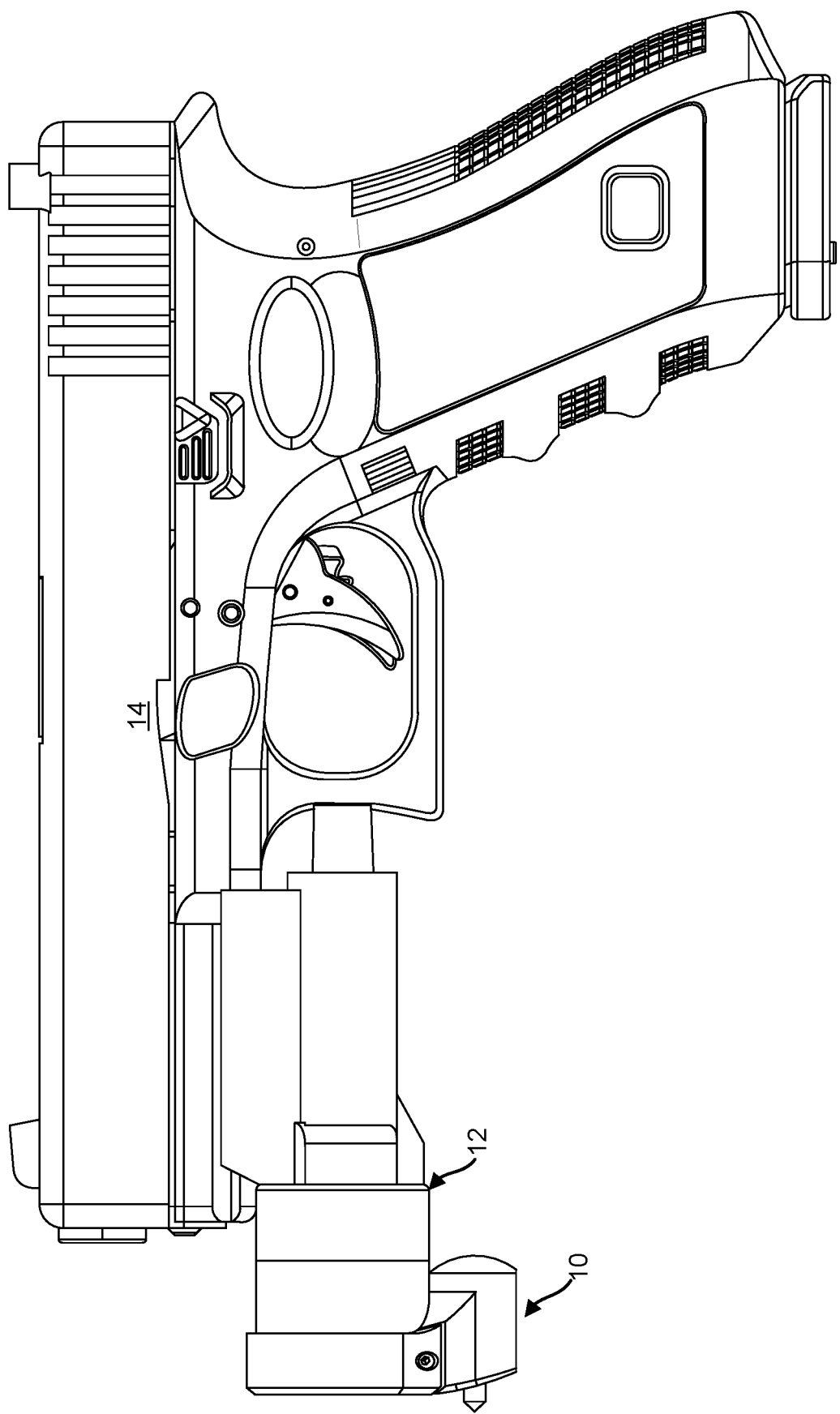
FIG. 1 is a side view of an embodiment of the glass break apparatus of the present disclosure shown in use with a firearm.

FIG. 1 is an illustration of one embodiment of the glass break apparatus of the present disclosure. In this embodiment, glass break apparatus 10 is shown affixed to one end of a light-emitting device 12. Light-emitting device 12 could be, for example, a light fixture that is attached to a firearm 14, that is commonly used in the art, for example, by law enforcement, which allows the officer to illuminate an area while simultaneously deploying the firearm. The attachment of light-emitting device 12 to a firearm 14 is merely exemplary and the present disclosure is not limited in this regard. As will be shown below in other embodiments, glass break apparatus 10 can be attached to a flashlight, any other light-emitting device 12. Further, in other embodiments, glass break apparatus 10 can be attached to something other than a light-emitting device 12. For example, glass break apparatus 10 can be affixed to an axe, directly to a firearm (without the light-emitting device 12), or any other object. In addition, the type of firearm shown in the figures is also exemplary and not limiting. Thus, glass break apparatus 10 can be designed to be affixed to any light-emitting device 12 and that light emitting device 12 used with any type of firearm.

Figure 2:
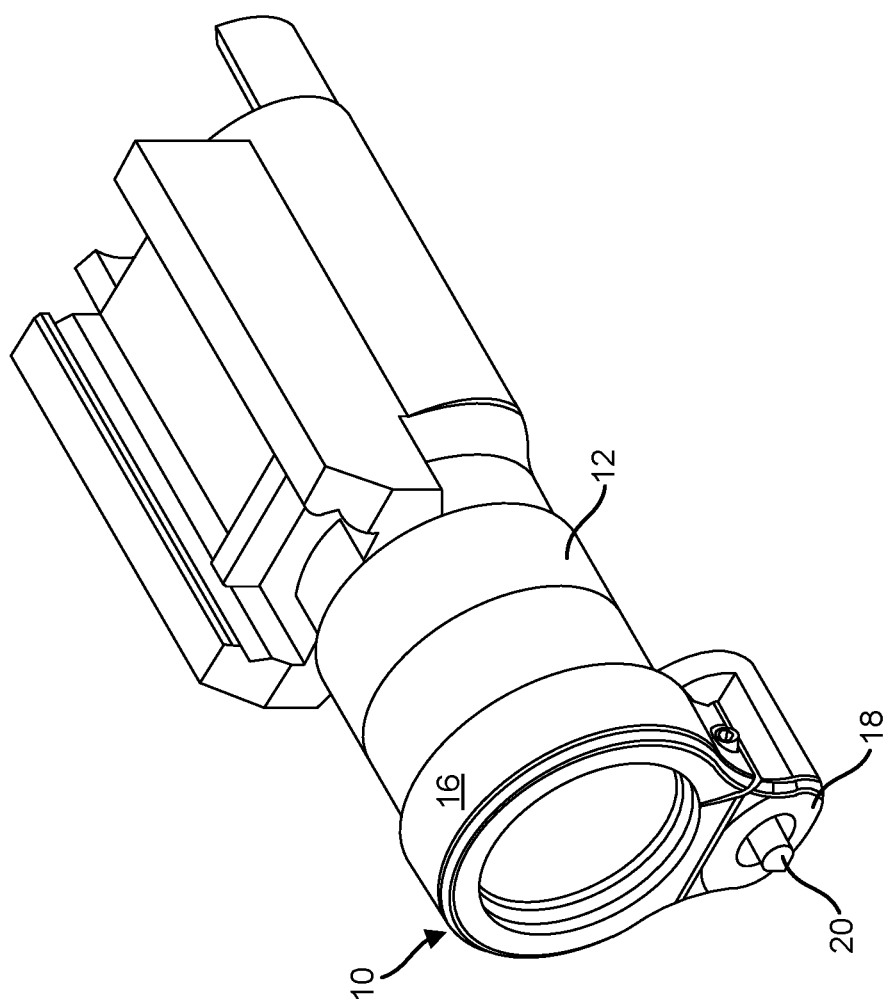
FIG. 2 is a perspective view of the glass break apparatus embodiment of FIG. 1.

FIG. 2 shows a perspective and closer view of glass break apparatus 10. Glass break apparatus 10 includes an attachment mechanism 16, which is configured to attach to an end of light-emitting device 12. In the non-limiting embodiment shown in FIG. 2, attachment mechanism 16 is an arcuate clamp that is configured to be removably attached to one end of the light-emitting device 12. Attachment mechanism 16 can be affixed to light-emitting device in a variety of different ways, each of which is incorporated in this disclosure. For example, attachment mechanism can have interior grooves that interact with corresponding protrusions along the exterior of light-emitting device 12, in order to affix attachment mechanism 16 to light-emitting device 12 in a manner similar to screwing the top of a jar on to the body of the jar. In other embodiments, attachment mechanism 16 can be secured to the end of light-emitting device 12 via a friction fit. The present disclosure is not limited to the ways in which attachment mechanism 16 can be secured to light-emitting device 12.

Glass break apparatus 10 also includes a receptacle 18, which is coupled to attachment mechanism 16, as shown in FIGS. 1 and 2. While FIGS. 1 and 2 show receptacle 18 at the 6 o'clock position, i.e., below attachment mechanism 16, it is within the scope of the present disclosure to maintain receptacle 18 at any position around the circumference of attachment mechanism 16. For example, receptacle 18 can be affixed such that it is at a 3 o'clock orientation, or a 9 o'clock orientation, or a 12 o'clock orientation with respect to attachment mechanism 16, or any position along the other circumference of attachment mechanism 16. As seen in FIGS. 1 and 2, one end of an elongated glass punch 20 can be seen protruding at least partially from receptacle 18. As will be discussed in greater detail below, the first end of glass punch 20 can move between a retracted position within the interior of receptacle 18 when not being used to strike glass, and an extended position when it impacts glass. Advantageously, while in the extended position, the first end of glass punch 20 extends beyond the plane of attachment mechanism 16 or any other part of light-emitting device 12 and firearm 14. In this fashion, attachment mechanism 16, light-fixture 12 and firearm 14 will not impede and prevent the first end of glass punch 20 from striking and breaking the glass.

It should be noted that attachment mechanism 16 need to not be circular as shown in the figures. The shape and size of attachment mechanism 16 can vary in order to accommodate the shape and size of the light-emitting device 12 to which it is being attached. In various embodiments, the first end of glass punch 20 extends beyond the plane of any other hardware, e.g., attachment mechanism 16, light-emitting device 12, or firearm 14 (or any apparatus to which glass break apparatus 10 or light-emitting device 12 is attached). In this fashion, glass punch 20 can be used to strike and break a piece of glass when, upon impact, the first end of glass punch 20 moves to the extended position. This will be described in greater detail below.

Figure 3:
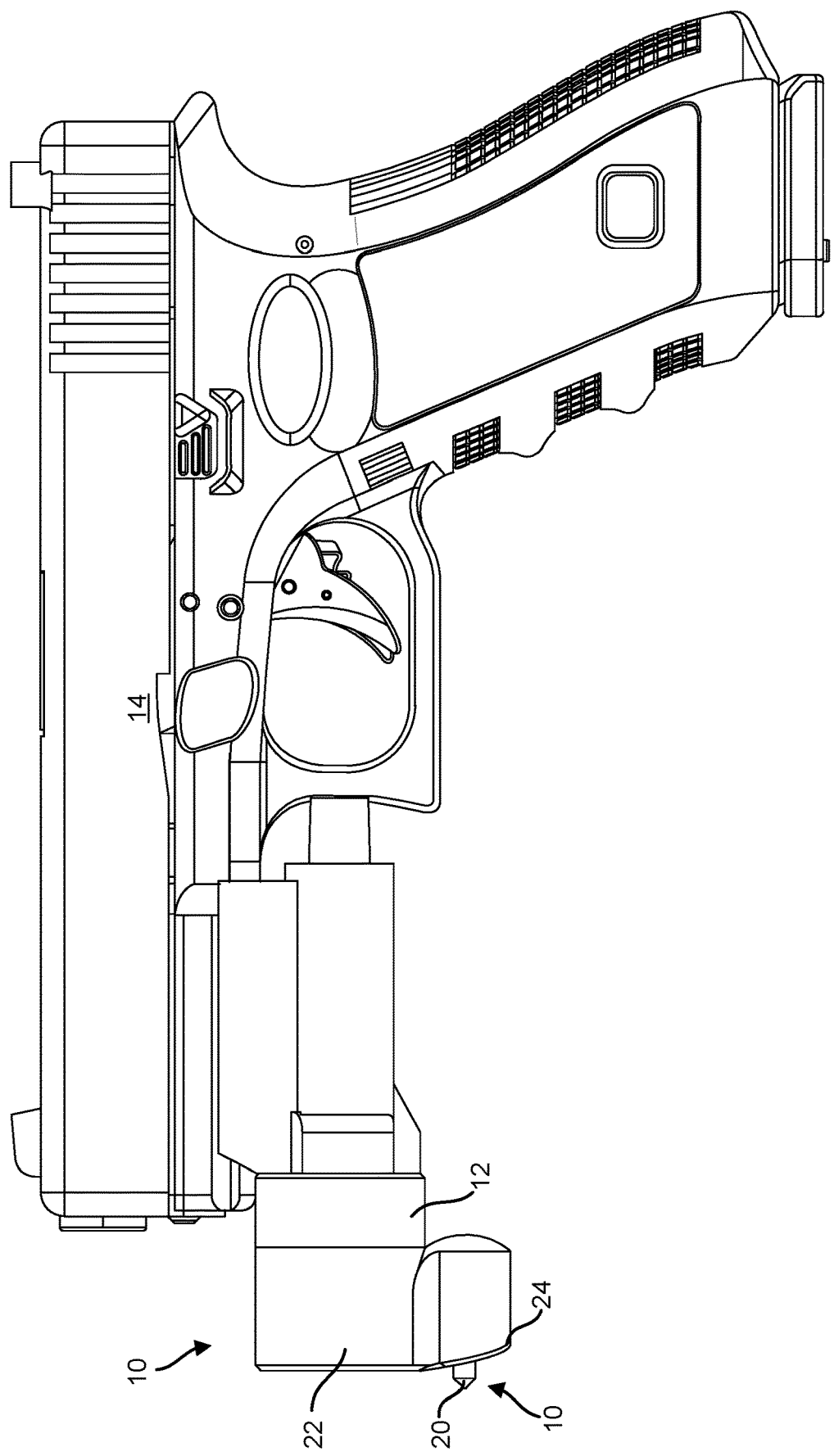
FIG. 3 is a side view of an alternate embodiment of the glass break apparatus of the present disclosure shown in use with a firearm.
Figure 4:
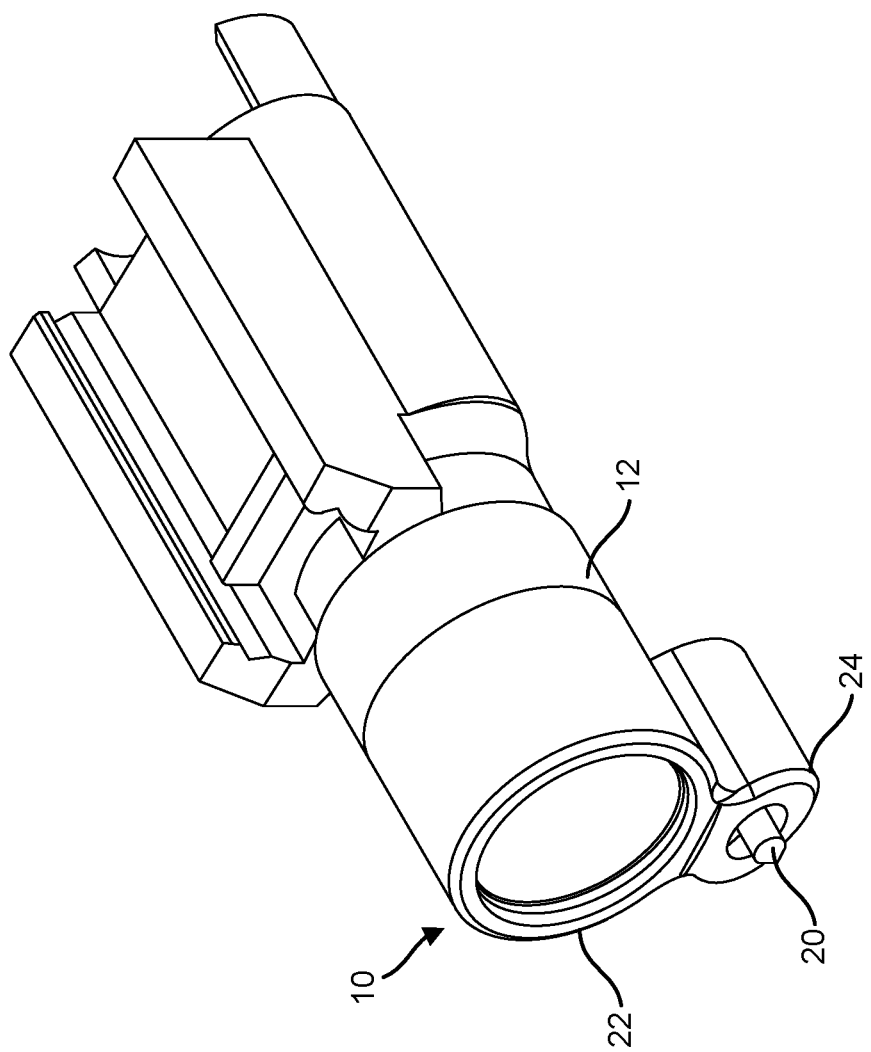
FIG. 4 is a perspective view of the glass break apparatus embodiment of FIG. 3.

FIG. 3 and FIG. 4 illustrate another embodiment of the present disclosure. In this embodiment, light-emitting device 12 includes an outer casing, or bezel 22. Glass break apparatus 10 includes a receptacle 24, which is incorporated into bezel 22 as shown in FIG. 3. Receptacle 24 includes glass punch 20 at least partially housed therein, glass punch 20 including a first end and a second end, where glass punch 20 is configured to move between a retracted position within the interior of receptacle 24 and an extended position upon glass punch 20 striking the glass surface.

Advantageously, the embodiment shown in FIG. 3 and FIG. 4 allows for a single bezel 22 to be manufactured where receptacle 24 is formed as part of the bezel and therefore securely mounted to light-emitting device 12. Although receptacle 24 is shown in FIG. 3 is the "6-o'clock" position, this is illustrative only, and during manufacture, receptacle 24 can be oriented at any location with respect to light-emitting device 12. As described above, upon striking the surface of the glass, the first end of glass punch 20 extends beyond the plane of bezel 22, light-emitting device 12, and, if attached to a firearm, firearm 14. In this fashion, no object would impede or otherwise prevent glass punch 20 from striking and breaking the glass.

Figure 5:
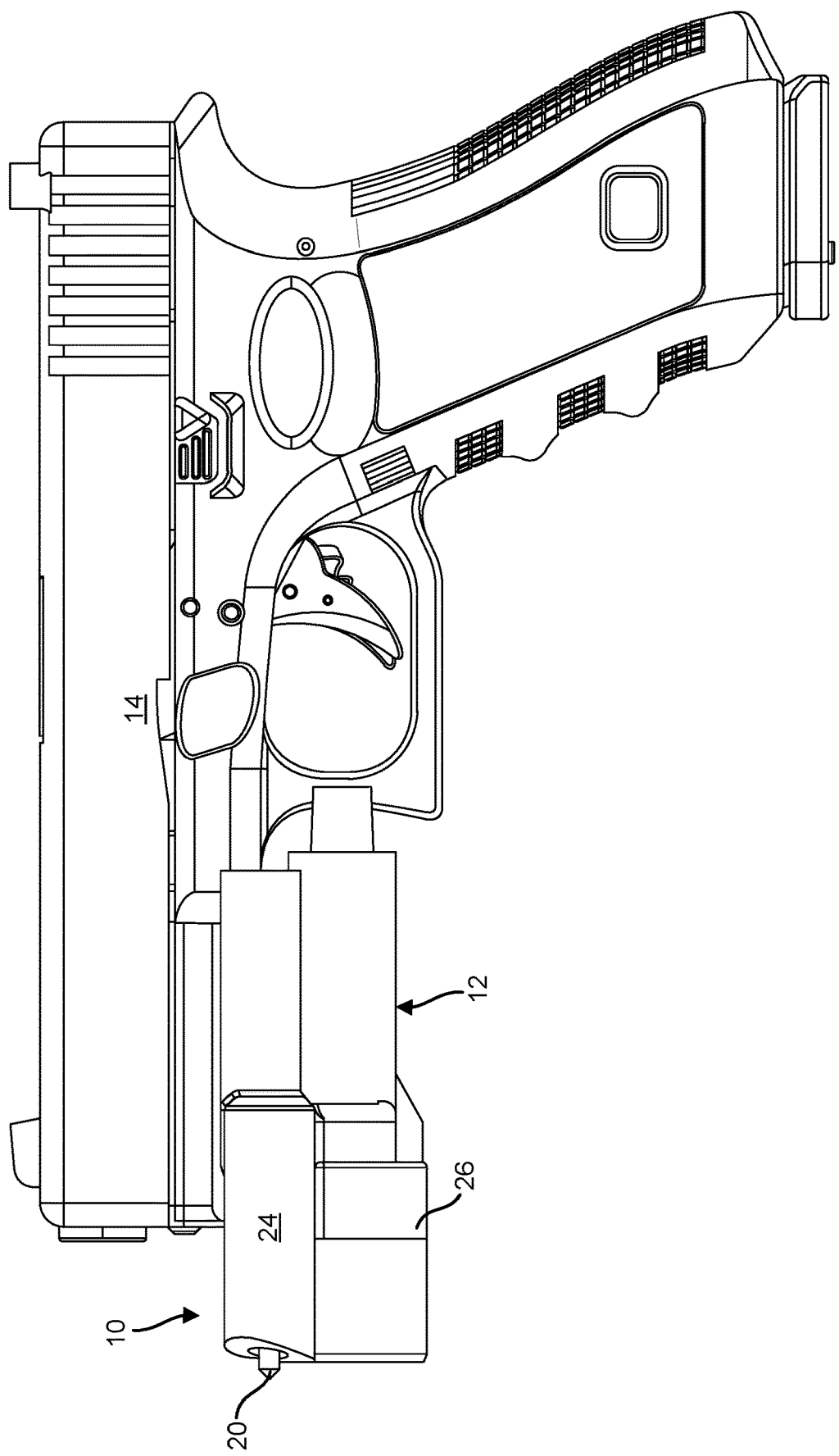
FIG. 5 is a side view of yet another embodiment of the glass break apparatus of the present disclosure shown in use with a firearm.
Figure 6:
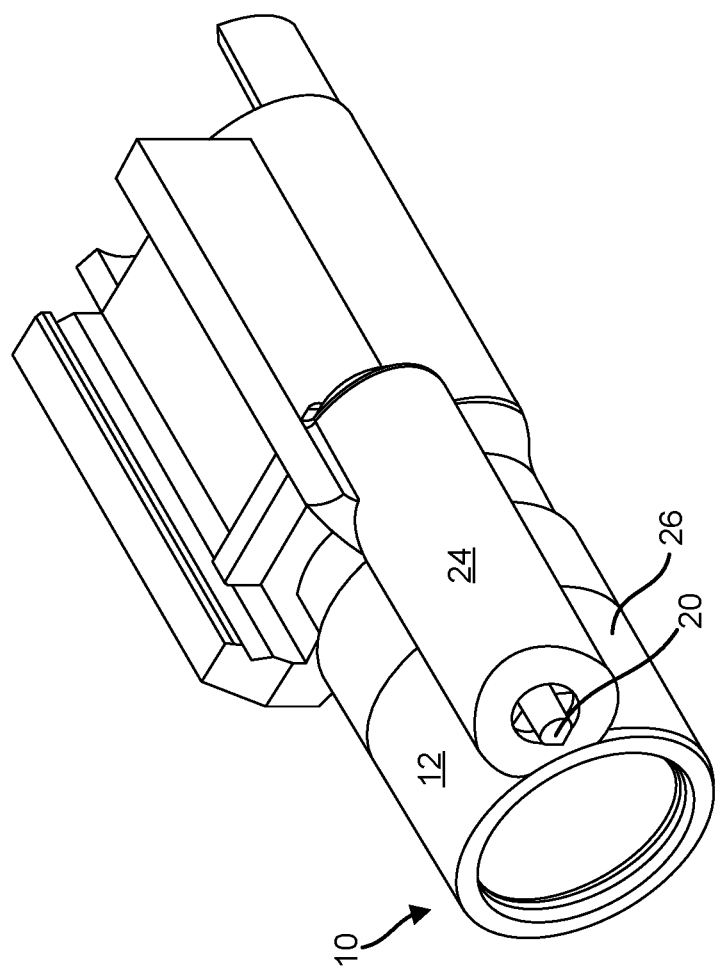
FIG. 6 is a perspective view of the glass break apparatus embodiment of FIG. 5.

FIG. 5 and FIG. 6 illustrate yet another embodiment of the glass break apparatus 10 of the present disclosure. In this embodiment, glass punch 20 resides within receptacle 24, which is incorporated into a housing 26 of light-emitting device 12. In this embodiment, receptacle 24 is larger than the receptacle 24 shown in FIGS. 3 and 4, since in this embodiment, a larger receptacle 24 is needed to be formed as part of the housing 26 in which light-emitting device 12 is housed. Although receptacle 24 is shown in FIG. 6 is the "2-o'clock" position, this is illustrative only, and during manufacture, receptacle 24 can be oriented at any location with respect to light-emitting device 12. Upon striking the surface of the glass, the first end of glass punch 20 extends beyond the plane of housing 26, light-emitting device 12, and, if attached to a firearm, firearm 14. In this fashion, no object would impede or otherwise prevent glass punch 20 from striking and breaking the glass.

Figure 7:
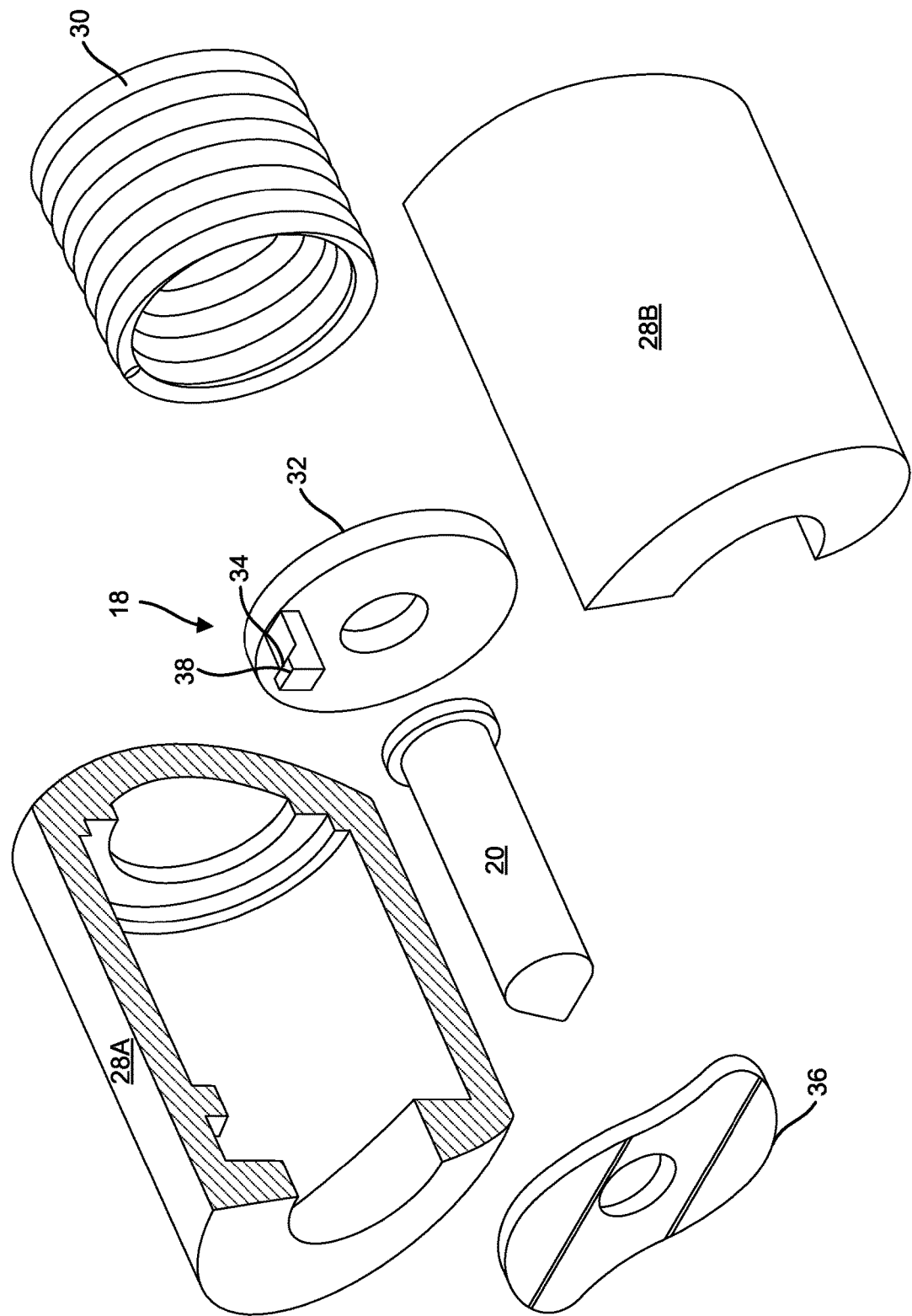
FIG. 7 is an exploded view of the receptacle and glass punch element of the glass break apparatus of the present disclosure.

FIG. 7 is an exploded view of receptacle 18 and glass punch 20 in accordance with one embodiment of glass break apparatus 10 of the present disclosure. Receptacle includes side walls 28A and 28B, compression spring 30, brace 32, flange 34 extending from brace 32, seal 36 and glass punch 20.

FIG. 8A is an illustration of glass punch 20 in an initial retracted position within receptacle 18 prior to glass break apparatus 10 being used to strike a glass surface. Under compression, spring 30 holds glass punch 20 in place within receptacle 18 by applying pressure to brace 32.

In FIG. 8B, glass punch 20 is shown upon or just after impact with the surface of the glass. Once outside force is exerted downward on glass punch 20 due to its impact with the surface of the glass, brace 32 is released as shown, extending flange 34 forward.

FIG. 8C is an illustration of glass punch 20 in an extended position subsequent to impact. Here, the release of brace 32 causes glass punch 20 to move forward in the extended position. Flange 34 "catches" on interior knob 38 within the interior wall 28A (or 28B) of receptacle 18. This "locks" brace 32 and spring 30 in place, in a forward position, therefore maintaining glass punch 20 in its extended position.

It should be noted that the mechanism depicted in FIGS. 8A through 8C is exemplary only and should not be deemed as limiting. Thus, other mechanisms can be used to allow glass punch 20 to be thrust forward and strike/break a surface of glass.

Figure 9:
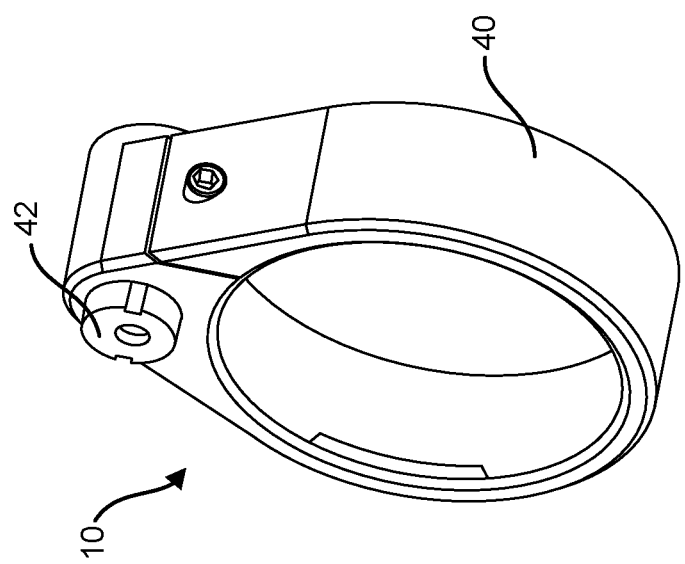
FIG. 9 is a perspective view of still another embodiment of the glass break apparatus of the present disclosure.

FIG. 9 is a perspective view of another embodiment of the glass break apparatus 10 of the present disclosure. In this embodiment, glass break apparatus 10 is used in conjunction with a flashlight, shown in FIGS. 10 and 11. In this embodiment, glass break apparatus 10 includes collar 40, which is sized to encircle and be removably affixed to a light emitting device such as a flashlight 44 (shown in FIGS. 10 and 11). Within a portion of collar 40 is a tubular casing 42, which extends slightly beyond the plane of collar 40. A glass punch 20 (not shown) is embedded within casing 42 and the end point of glass punch 20 can be forcibly extended forward and beyond the plane of casing 42 in order to strike and break a pane of glass, much like in the manner described above.

Figure 10:
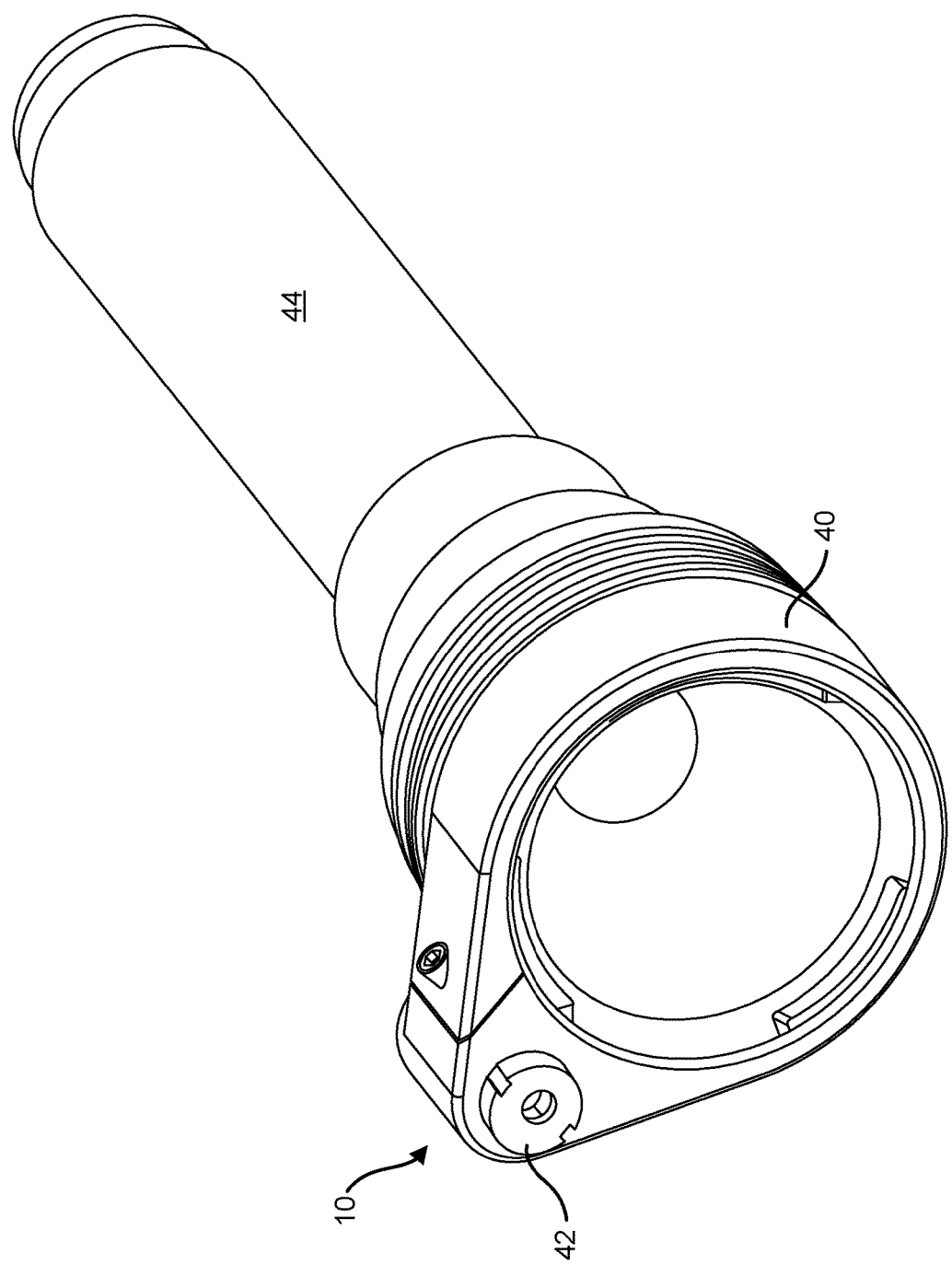
FIG. 10 is a perspective view of the glass break apparatus embodiment of FIG. 9 used with a flashlight.
Figure 11:
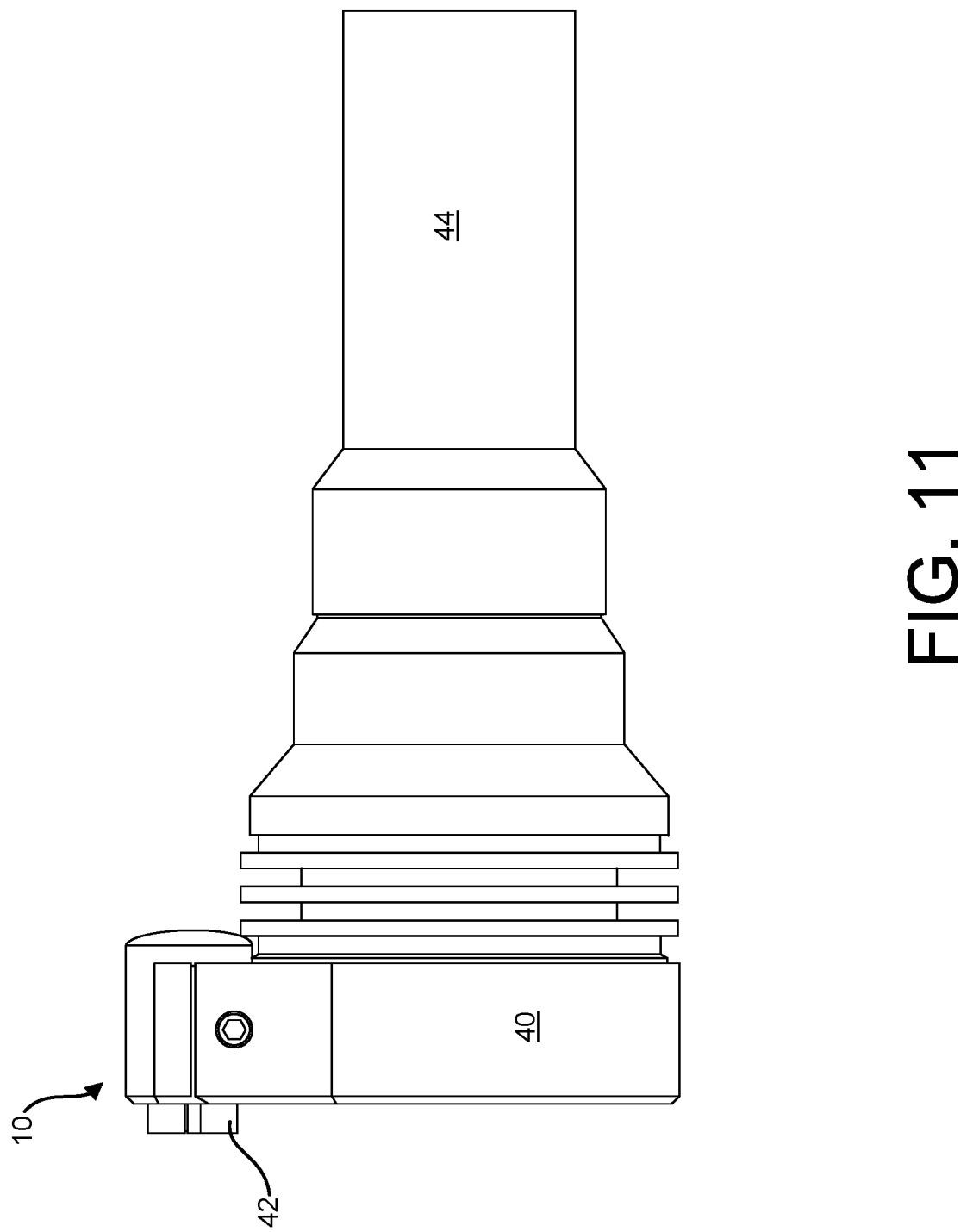
FIG. 11 is a side view of the glass break embodiment of FIG. 9 used with a flashlight.

FIG. 10 and FIG. 11 provide views of glass break apparatus 10 used with flashlight 44. In one embodiment, the interior of collar 40 has a series of interior grooves which mate with corresponding exterior ridges on the outer surface of flashlight 44 such that collar 40 can be threaded to and secured to flashlight 44. As described above in the scenario where the light-emitting device was attached to a firearm, here the user can shine light from flashlight 44 on a desired location and then thrust the flashlight 44 forward towards an illuminated pane of glass and the glass punch 20 (not shown) extending from casing 42 can strike and break the glass. The user need only use one hand and one apparatus to both illuminate the area and break the glass.

It should be noted that glass break apparatus 10 can be used with any light-emitting device, i.e., not just a flashlight. Further, the light-emitting device to which glass-break apparatus 10 is affixed to can, itself, be attached to other devices, such as a firearm or other weapon, an axe, or any other device that may be used by the police, fire department, or an ordinary citizen. This opens up a myriad of possibilities and scenarios for which glass break apparatus 10 may be used.

While the disclosure has been described in its preferred form or embodiment with some degree of particularity, it is understood that this description has been given only by way of example and that numerous changes in the details of construction, fabrication, and use, including the combination and arrangement of parts, may be made without departing from the spirit and scope of the disclosure.

What is claimed is:

1. A glass break apparatus comprising:
   an attachment mechanism comprising:
      an attachment clamp configured to attach to a light-emitting end of a light-emitting device; and
      a receptacle coupled to the attachment clamp; and
   an elongated glass punch retained at least partially within the receptacle, the glass punch having a first end and a second end, the glass punch configured to move between a retracted position within the interior of the receptacle and an extended position due to impact with a surface of glass, the first end of the glass punch extending beyond a plane of the attachment clamp while in the extended position.

2. The glass break apparatus of claim 1, wherein the elongated glass punch further comprises:
   a spring configured to alternate between a compressed configuration and an expanded configuration within the receptacle; and
   a brace abutting the second end of the glass punch, the brace comprising:
      a substantially flat portion; and
      a flange extended tangentially from the flat portion of the brace and configured to be secured within a first location on the interior of the receptacle when the spring is in the compressed configuration thus maintaining the punch in the retracted position,
   wherein when a predetermined amount of force is applied on the first end of the elongated glass punch, the flange of the brace is released from the first location on the interior of the receptacle and is secured in a second location on the interior of the receptacle allowing the spring to move to the expanded configuration moving the glass punch to the extended position towards the surface of the glass.

3. The glass break apparatus of claim 1, further comprising a seal situated within an open end of the receptacle, the seal configured to reduce an amount of debris from entering the open end of the receptacle.

4. The glass break apparatus of claim 1, wherein the light-emitting device is attachable to a firearm.

5. The glass break apparatus of claim 1, wherein the light-emitting device is a flashlight.

6. The glass break apparatus of claim 1, wherein the receptacle has a first longitudinal axis and the attachment clamp has a second longitudinal axis, wherein the first axis is non-collinear with the second axis.

7. The glass break apparatus of claim 1, wherein at least a portion of the receptacle does not extend beyond the light-emitting end of the light-emitting device.

\* \* \* \* \*